(12) United States Patent
Yamaguchi et al.

(10) Patent No.: US 12,132,881 B2
(45) Date of Patent: Oct. 29, 2024

(54) STEREO CAMERA APPARATUS

(71) Applicant: HITACHI ASTEMO, LTD., Hitachinaka (JP)

(72) Inventors: Akihiro Yamaguchi, Tokyo (JP); Hidenori Shinohara, Hitachinaka (JP); Kenichi Takeuchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/769,270

(22) PCT Filed: Sep. 17, 2020

(86) PCT No.: PCT/JP2020/035192
§ 371 (c)(1),
(2) Date: Apr. 14, 2022

(87) PCT Pub. No.: WO2021/075202
PCT Pub. Date: Apr. 22, 2021

(65) Prior Publication Data
US 2024/0137478 A1   Apr. 25, 2024
US 2024/0236284 A9   Jul. 11, 2024

(30) Foreign Application Priority Data
Oct. 18, 2019   (JP) ................................ 2019-191567

(51) Int. Cl.
*H04N 13/239*   (2018.01)
*H04N 23/51*   (2023.01)
*H04N 23/54*   (2023.01)

(52) U.S. Cl.
CPC .......... *H04N 13/239* (2018.05); *H04N 23/51* (2023.01); *H04N 23/54* (2023.01)

(58) Field of Classification Search
CPC ....... H04N 13/239; H04N 23/51; H04N 23/54
(Continued)

(56) References Cited

U.S. PATENT DOCUMENTS

2012/0086784 A1   4/2012   Oh et al.
2014/0267621 A1*  9/2014   Takahashi ............. H04N 23/54
                                                   348/46
(Continued)

FOREIGN PATENT DOCUMENTS

JP   2011-172174 A   9/2011
JP   2012-85290 A   4/2012
(Continued)

OTHER PUBLICATIONS

International Search Report with English Translation of Patent Application No. PCT/JP2020/035192 dated Dec. 8, 2020 (5 pages).
(Continued)

*Primary Examiner* — Kathleen M Walsh
(74) *Attorney, Agent, or Firm* — Foley & Lardner LLP (57) ABSTRACT

A stereo camera apparatus includes a housing, a first camera unit attached to the housing, a second camera unit attached to the housing, a processing device that performs image processing by using captured images acquired by capturing of the first camera unit and the second camera unit, and a circuit board on which the processing device is mounted. In the housing, a base length direction of the first camera unit and the second camera unit is a longitudinal direction, the housing and the circuit board are bonded to each other by an adhesive, and in a region in the housing, onto which the adhesive is applied, a length in the base line length direction is shorter than a length in an orthogonal direction that is a direction perpendicular to the base length direction.

7 Claims, 12 Drawing Sheets

(58) Field of Classification Search
USPC .......................................................... 348/47
See application file for complete search history.

(56) References Cited

U.S. PATENT DOCUMENTS

| | | |
|---|---|---|
| 2016/0006911 A1 | 1/2016 | Kimura et al. |
| 2019/0007586 A1 | 1/2019 | Akaiwa et al. |
| 2019/0098184 A1* | 3/2019 | An .......................... G03B 17/02 |
| 2019/0285830 A1 | 9/2019 | Nakamura |

FOREIGN PATENT DOCUMENTS

| | | | | |
|---|---|---|---|---|
| JP | 2015-184311 A | 10/2015 | | |
| JP | 2016-14564 A | 1/2016 | | |
| JP | 2018-85614 A | 5/2018 | | |
| JP | 2019-8240 A | 1/2019 | | |
| KR | 20120079420 A * | 7/2012 | ........... | H04N 13/239 |
| WO | WO-2017179516 A1 * | 10/2017 | ............... | G02B 7/02 |

OTHER PUBLICATIONS

Written Opinion of Patent Application No. PCT/JP2020/035192 dated Dec. 8, 2020 (3 pages).

\* cited by examiner

STEREO CAMERA APPARATUS

TECHNICAL FIELD

The present invention relates to a stereo camera apparatus.

BACKGROUND ART

In a stereo camera apparatus including a plurality of camera units in a configuration, a position and posture relation between the camera units are determined in advance by design. Various calculations are performed on an image obtained by capturing of the stereo camera apparatus on the assumption that the position and posture relation between the camera units have design values. Since the position and posture relation between the cameras has a large influence on the calculations, it is desirable that the change in an environmental condition such as a temperature does not have an influence on the position and posture relation between the cameras. PTL 1 discloses a three-dimensional imaging device including a printed circuit board on which two camera modules including an image sensor are mounted, and a reinforcing member in which two exposure windows are formed. In the three-dimensional imaging device, the camera modules of the printed circuit board are disposed and mutually adhered to each other, so as to be exposed through the exposure windows of the reinforcing member.

CITATION LIST

Patent Literature

PTL 1: JP 2012-85290 A

SUMMARY OF INVENTION

Technical Problem

In the invention disclosed in PTL 1, there is room for improvement in reducing the influence of a temperature change on the position and posture relation between the camera units.

Solution to Problem

According to a first aspect of the present invention, a stereo camera apparatus includes a housing, a first camera unit attached to the housing, a second camera unit attached to the housing, a processing device that performs image processing by using captured images acquired by capturing of the first camera unit and the second camera unit, and a circuit board on which the processing device is mounted. A base line length direction of the first camera unit and the second camera unit is a longitudinal direction of the housing. The housing and the circuit board are bonded to each other by an adhesive. In a region of the housing, onto which the adhesive is applied, a length in the base line length direction is shorter than a length in an orthogonal direction that is a direction perpendicular to the base line length direction.

Advantageous Effects of Invention

According to the present invention, it is possible to reduce an influence of a temperature change on a position and posture relation between camera units. Objects, configurations, and advantageous effects other than those described above will be clarified by the descriptions of the following forms for embodying the present invention.

DESCRIPTION OF EMBODIMENTS

Hereinafter, embodiments of the present invention will be described with reference to the drawings. Examples are provided for describing the present invention, and are omitted and simplified as appropriate for clarity of description. The present invention can be implemented in various other forms. Unless otherwise specified, each component may be singular or plural. Positions, sizes, shapes, ranges, and the like of the components illustrated in the drawings may not represent actual positions, sizes, shapes, ranges, and the like in order to facilitate understanding of the invention. Therefore, the present invention is not necessarily limited to the positions, sizes, shapes, ranges, and the like illustrated in the drawings. In a case where there is a plurality of components having the same or similar functions, the same reference signs may be denoted with different subscripts for description. In addition, in a case where it is not necessary to distinguish the plurality of components, the description may be made by omitting the subscript.

First Embodiment

A stereo camera apparatus according to a first embodiment will be described below with reference to FIGS. 1 to 5.

Figure 1:
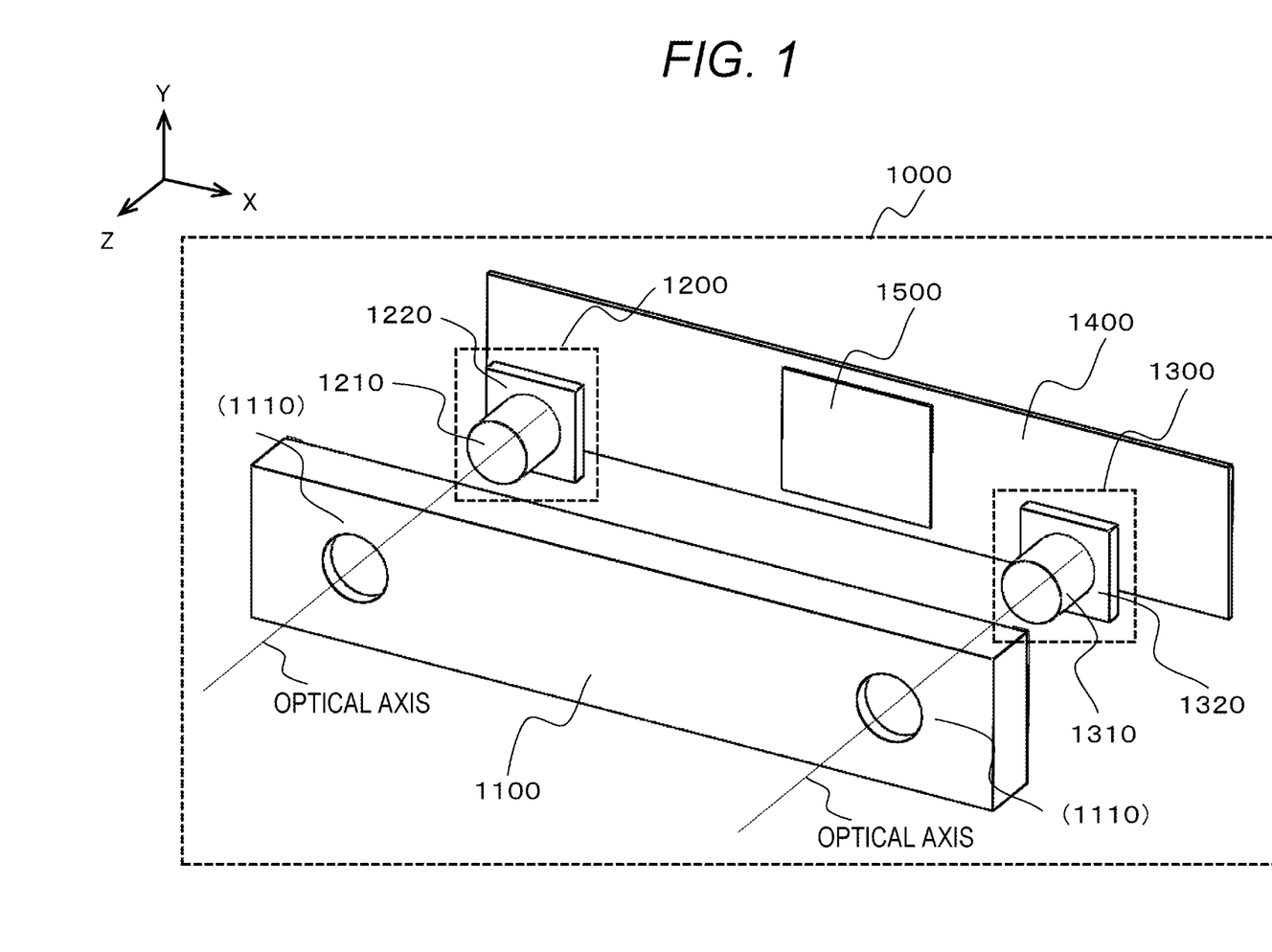
FIG. 1 is an exploded perspective view of a stereo camera apparatus.
Figure 2:
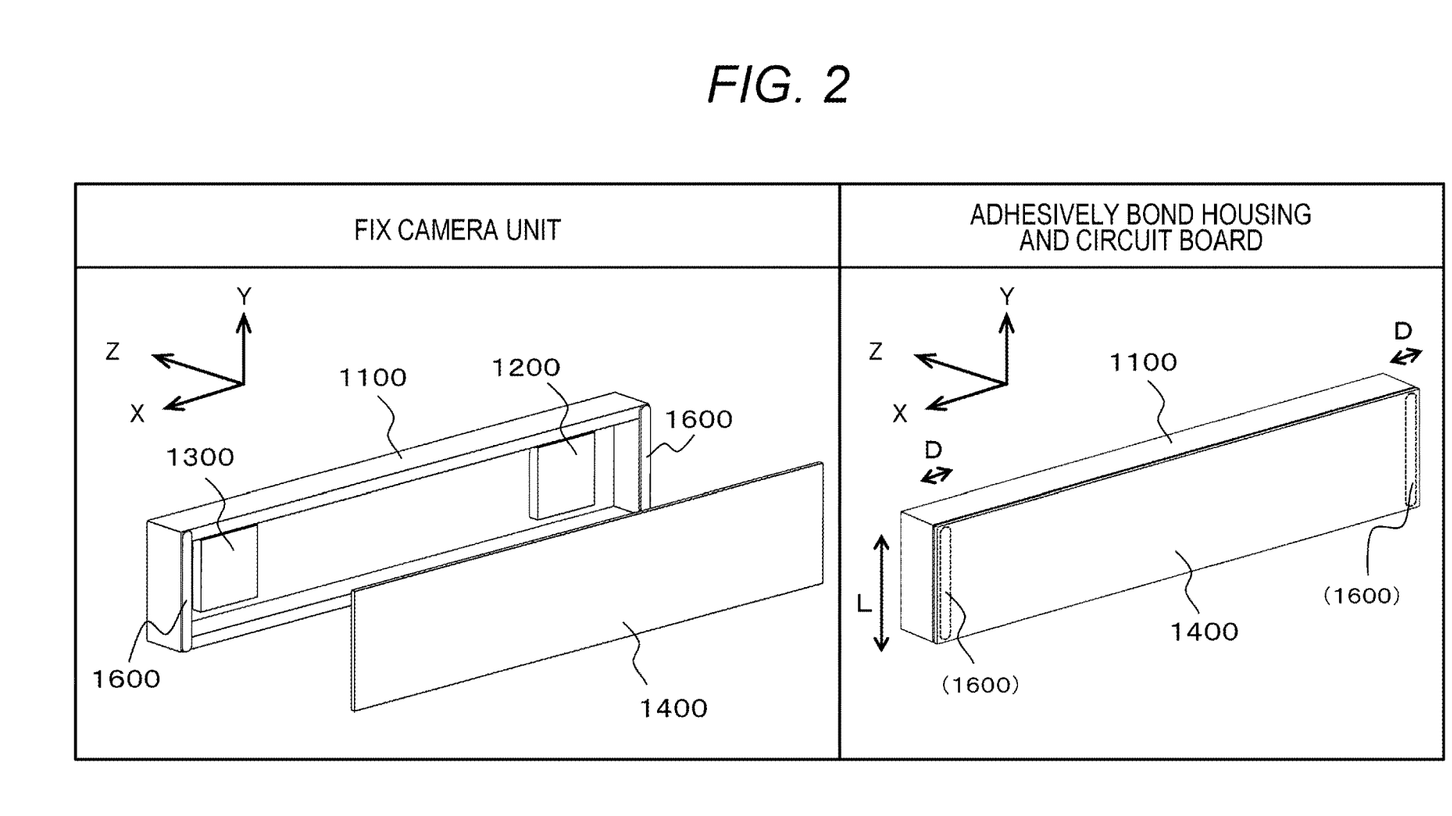
FIG. 2 is a view illustrating a step of assembling a housing.
Figure 3:
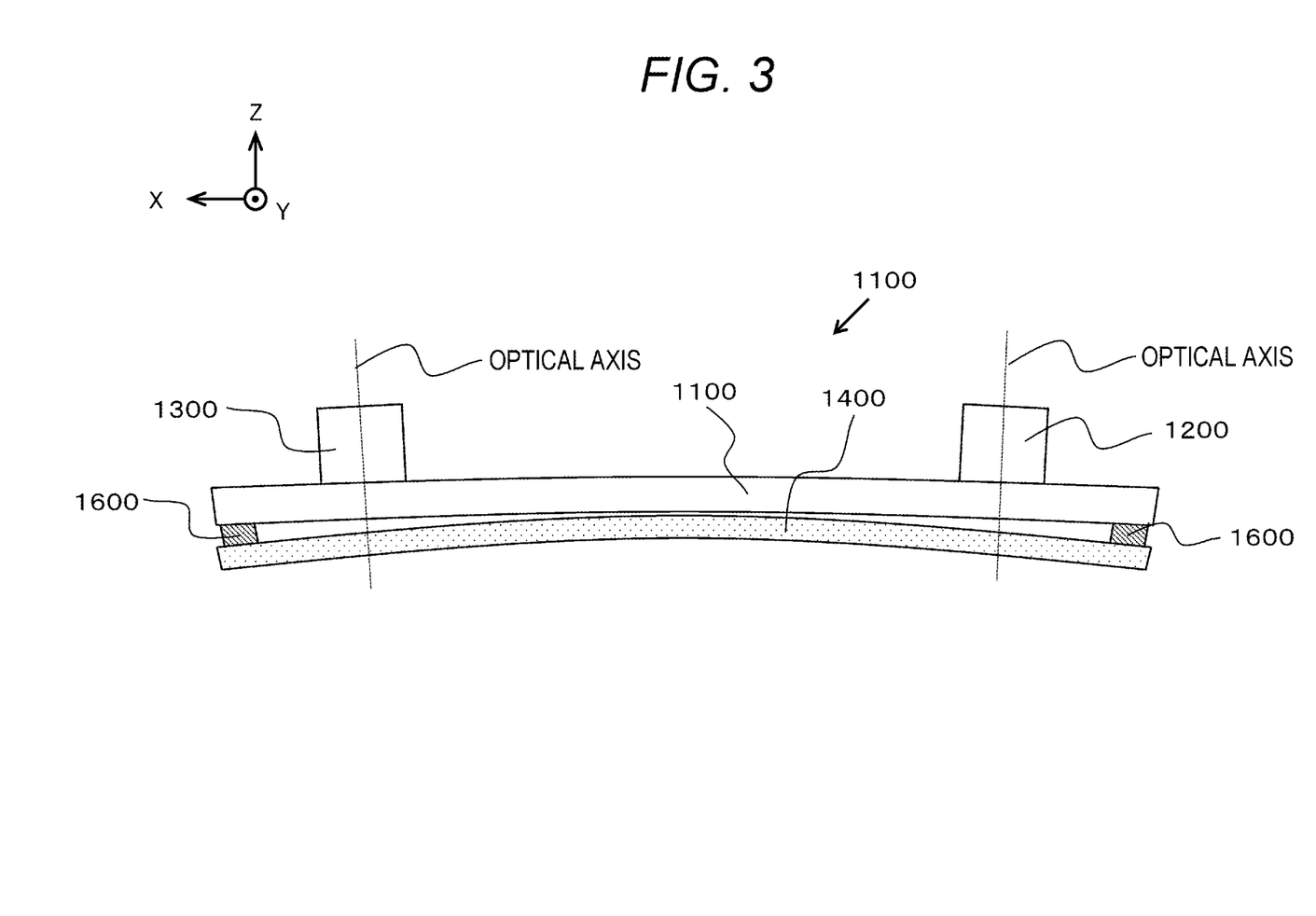
FIG. 3 is a conceptual view illustrating a specific effect of the stereo camera apparatus.

FIG. 1 is an exploded perspective view of a stereo camera apparatus 1000. FIGS. 1 to 3 illustrate common X, Y, and Z axes in order to clarify the correlation between the drawings. The stereo camera apparatus 1000 includes a housing 1100, a first camera unit 1200, a second camera unit 1300, a circuit board 1400, and a processing device 1500. The stereo camera apparatus 1000 has a substantially rectangular parallelepiped shape as a whole. The housing 1100 has a box shape without a top surface, and has a configuration corresponding to a bottom surface and a side surface of a substantially rectangular parallelepiped. The circuit board 1400 has a configuration corresponding to the top surface facing the bottom surface of the substantially rectangular parallelepiped.

For the housing 1100, a metal die-cast product made of an aluminum alloy, a magnesium alloy, or the like is used from the viewpoint of dimensional accuracy and heat dissipation. As a material of the circuit board 1400, fiber-reinforced plastic such as glass fiber-reinforced epoxy resin is used. Various combinations of materials of the housing 1100 and the circuit board 1400 can be used, but the linear expansion coefficient of the circuit board 1400 is larger. Further, due to the material and the shape, the housing 1100 has higher rigidity than the circuit board 1400 and is less likely to be deformed.

The first camera unit 1200 includes a first lens unit 1210 and a first imaging element 1220. The first camera unit 1200 forms an image of optical information acquired from the outside by the first lens unit 1210, on the first imaging element 1220. The second camera unit 1300 includes a second lens unit 1310 and a second imaging element 1320. The second camera unit 1300 forms an image of optical information acquired from the outside by the second lens unit 1310, on the second imaging element 1320.

The first camera unit 1200 and the second camera unit 1300 are attached to a first-camera-unit attachment portion 1110 and a second-camera-unit attachment portion 1120 of the housing 1100 in a state where the optical axes of the first camera unit 1200 and the second camera unit 1300 are substantially parallel to each other. Since the first-camera-unit attachment portion 1110 and the second-camera-unit attachment portion 1120 are provided on the Z-axis negative side of the housing 1100, reference signs are enclosed in parentheses in FIG. 1.

The above-described XYZ axes are as follows. The X axis is parallel to the direction of a base length of the first camera unit 1200 and the second camera unit 1300. An X-axis direction is also referred to as a "base line length direction" below. The Z axis is parallel to the optical axes of the first camera unit 1200 and the second camera unit 1300 and perpendicular to the X axis. The Y axis is perpendicular to the X axis and the Z axis. A Y-axis direction is also referred to as an "orthogonal direction" below.

The processing device 1500 is mounted on the circuit board 1400. The processing device 1500 acquires image information acquired from the outside by the first camera unit 1200 and the second camera unit 1300 via a signal line (not illustrated). Then, the processing device 1500 calculates the distance from a subject by processing the image information.

FIG. 2 is a view illustrating a step of assembling the housing 1100. Although the drawings are arranged on the left and right in FIG. 2, both have the same viewpoint, and the stereo camera apparatus 1000 is illustrated in the directions of the XYZ axes indicated at the upper part of FIG. 2. The left side of FIG. 2 illustrates a state in which the first camera unit 1200 and the second camera unit 1300 are attached to the housing 1100 from the state of FIG. 1. In this state, the adhesive 1600 is applied onto both ends of the housing 1100 in the base line length direction, that is, an end portion on the positive side in the X axis and an end portion on the negative side in the X axis, which are on a surface of the housing 1100 on the Z-axis negative side. That is, in the first embodiment, the adhesive 1600 is not applied onto the long side of the housing 1100, but onto only a short side. In other words, the adhesive 1600 is linearly applied in the direction perpendicular to the base line length direction.

In a region of the housing 1100, onto which the adhesive 1600 is applied, the length in the base line length direction is referred to as "D", and the length in the orthogonal direction is referred to as "L". In the present embodiment, the length D in the base line length direction corresponds to the width of the adhesive 1600 linearly applied onto the end portion in the base line length direction. The length L in the orthogonal direction corresponds to the length of the housing 1100 in the orthogonal direction. In the present embodiment, the length D in the base line length direction is shorter than the length L in the orthogonal direction being a direction perpendicular to the base line length direction.

The adhesive 1600 contains any one of modified acrylate, modified silicone, and urethane as a main component. The elastic modulus of the adhesive 1600 is equal to or less than 10% of the elastic moduli of the materials of the circuit board 1400 and the housing 1100.

Next, as illustrated on the right side of FIG. 2, the circuit board 1400 and the housing 1100 are integrated by using the adhesive 1600. Since the adhesive 1600 is not applied onto the long side of the housing 1100 as described above, the housing 1100 and the circuit board 1400 are fixed only on the short side. Therefore, as will be described below, a shift in the position and posture between the first camera unit 1200 and the second camera unit 1300 due to a temperature change is suppressed.

FIG. 3 is a conceptual view illustrating a specific effect of the stereo camera apparatus 1000. In a high-temperature environment, both ends in the longitudinal direction of the circuit board 1400 having a linear expansion coefficient greater than the linear expansion coefficient of the housing 1100 are fixed to the housing 1100. Thus, stretching due to temperature rise is restricted, and warpage occurs. Since the stereo camera apparatus 1000 in the present embodiment is fixed to the circuit board 1400 only on the short side of the housing 1100, deformation of the circuit board 1400 is less likely to be transmitted to the housing 1100 even in a case where warpage occurs in the circuit board 1400. Thus, the influence on the relative position and the relative posture between the first camera unit 1200 and the second camera unit 1300 is reduced.

Comparative Example

Figure 4:
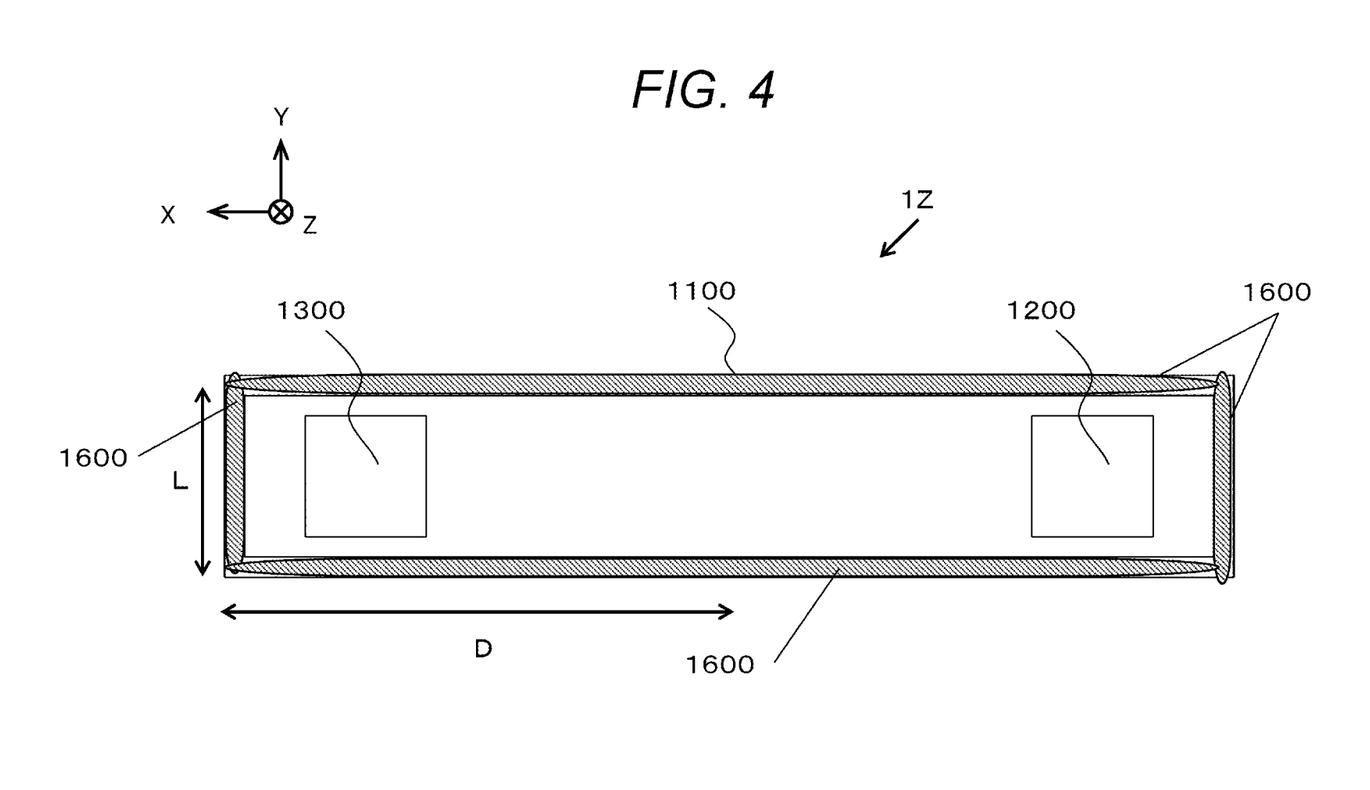
FIG. 4 is a view illustrating a comparative stereo camera apparatus as a comparative example.

FIG. 4 is a view illustrating a comparative stereo camera apparatus 1Z as a comparative example. The stereo camera apparatus 1000 according to the present embodiment has the same configuration as the comparative stereo camera apparatus 1Z except for a place onto which the adhesive 1600 is applied. The view point is slightly different, but the drawing of the stereo camera apparatus 1000 corresponding to FIG. 4 is the left drawing in FIG. 2. In the comparative stereo camera apparatus 1Z, the adhesive 1600 is applied onto the entire circumference of the housing 1100.

Therefore, in the comparative example, the length L in the orthogonal direction of the region onto which the adhesive 1600 is applied is equal to the length L in the stereo camera apparatus 1000, but the length D in the base line length direction is half the length of the comparative stereo camera apparatus 1Z in the base line length direction.

Figure 5:
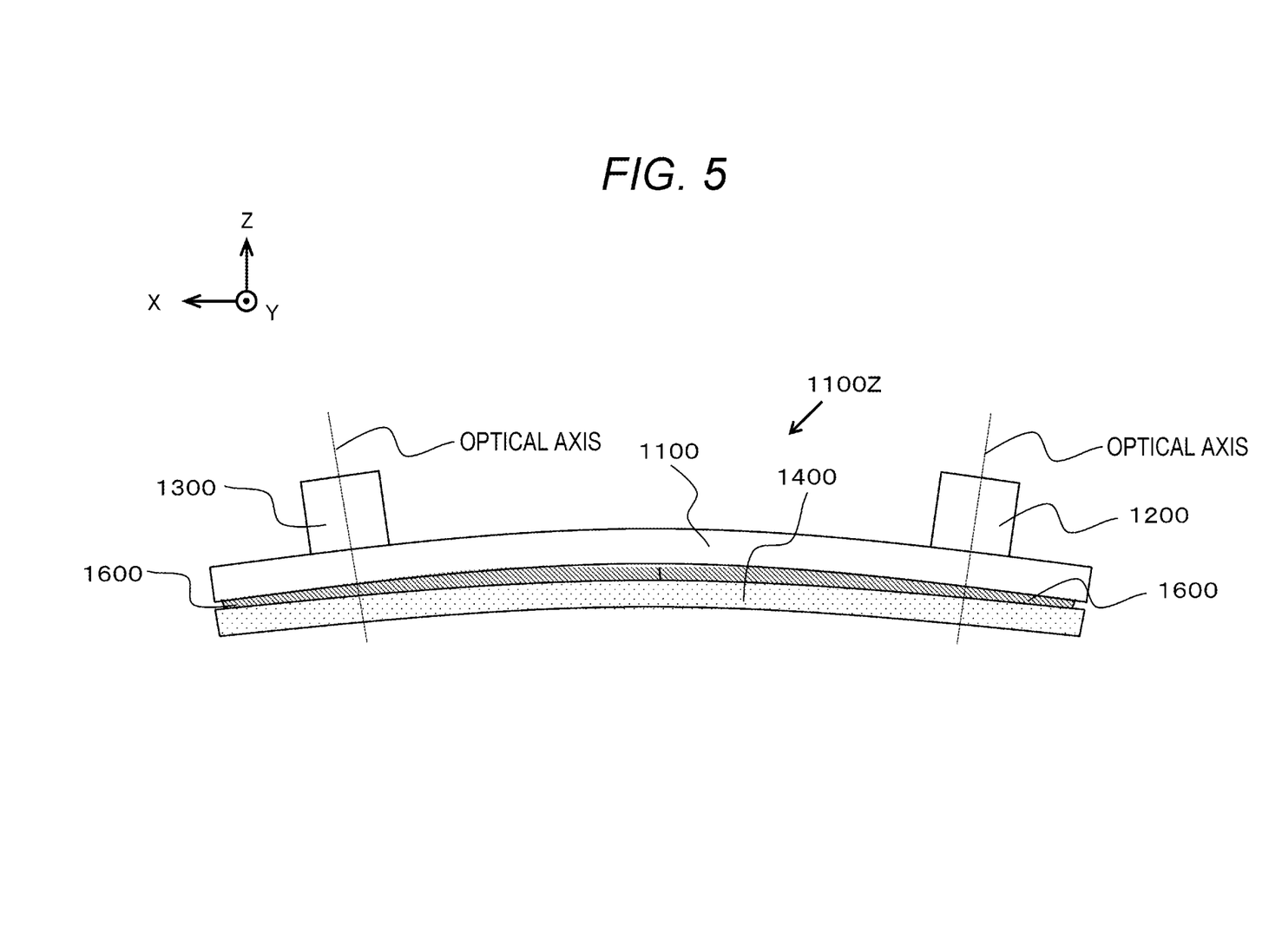
FIG. 5 is a view illustrating an influence of a temperature change in the comparative example.

FIG. 5 is a view illustrating the influence of the temperature change in the comparative example. In the comparative example, when the circuit board 1400 is warped due to a temperature change, the housing 1100 is deformed substantially in the similar manner to the circuit board 1400 because the housing 1100 is adhered to the entire region of the circuit board 1400 in the longitudinal direction. That is, warpage occurs in the housing 1100 similarly to the circuit board 1400, and thus the relative position and the relative posture between the first camera unit 1200 and the second camera unit 1300 fixed to the circuit board 1400 change.

The warpage deformation of the housing illustrated in FIG. 5 may be referred to as Yaw mode deformation, and an angular shift occurs between both optical axes of the first camera unit and the second camera unit. In an application using captured images of a plurality of cameras, for example, in creation of a distance image, the relative distance and the relative posture between the cameras greatly have a large influence on the calculation accuracy. Thus, the configuration of the comparative stereo camera apparatus 1Z is not preferable.

According to the first embodiment described above, it is possible to obtain the following operational effects.

(1) The stereo camera apparatus 1000 includes the housing 1100, the first camera unit 1200 attached to the housing 1100, the second camera unit 1300 attached to the housing 1100, the processing device 1500 that performs image processing by using captured images acquired by capturing of the first camera unit 1200 and the second camera unit 1300, and the circuit board 1400 on which the processing device 1500 is mounted. In the housing 1100, the base line length direction of the first camera unit 1200 and the second camera unit 1300 is the longitudinal direction. The housing 1100 and the circuit board 1400 are bonded to each other by the adhesive 1600. In the region of the housing 1100, onto which the adhesive 1600 is applied, the length D in the base line length direction is shorter than the length L in the orthogonal direction that is the direction perpendicular to the base line length direction. Therefore, in a high-temperature environment in which a difference in thermal expansion coefficient between the housing 1100 and the circuit board 1400 becomes apparent, the housing 1100 is less likely to warp even though warpage occurs in the circuit board 1400. Therefore, it is possible to reduce the influence of the temperature change on the position and posture relation between the first camera unit 1200 and the second camera unit 1300.

(2) The adhesive contains any one of modified acrylate, modified silicone, and urethane as the main component, and has an elastic modulus that is equal to or less than 10% of the elastic moduli of the circuit board and the housing.

Modification Example 1

Figure 6:
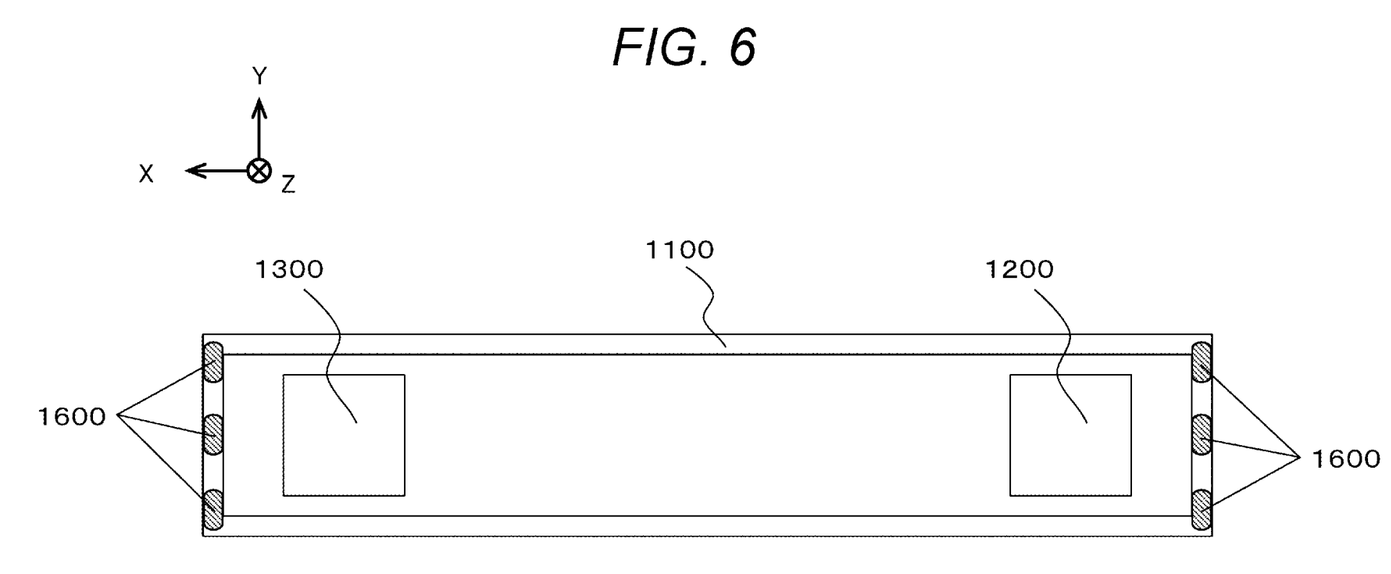
FIG. 6 is a view illustrating an application position of an adhesive in Modification Example 1.

FIG. 6 is a view illustrating an application position of the adhesive 1600 in Modification Example 1. As illustrated in FIG. 2 in the first embodiment, the surface onto which the adhesive 1600 is applied is bonded to the circuit board 1400. The adhesive 1600 is continuously applied in the lateral direction without any break in the first embodiment described above, but the adhesive 1600 may be discontinuously applied at intervals as illustrated in FIG. 6.

According to Modification Example 1, it is possible to reduce the application amount of the adhesive used for bonding the housing and the circuit board, leading to a reduction in material cost. In addition, it is possible to increase the ratio of the circumferential length to the area of the adhered portion, and thus to reduce the time required for fixing in a case where a hygroscopic curing type adhesive is used.

Second Embodiment

A stereo camera apparatus according to a second embodiment will be described below with reference to FIGS. 7 and 8. In the following description, the same components as those of the first embodiment are denoted by the same reference signs, and differences will be mainly described. The points not specifically described are the same as those in the first embodiment. The present embodiment is different from the first embodiment mainly in a shape of the end portion of the housing.

Figure 7:
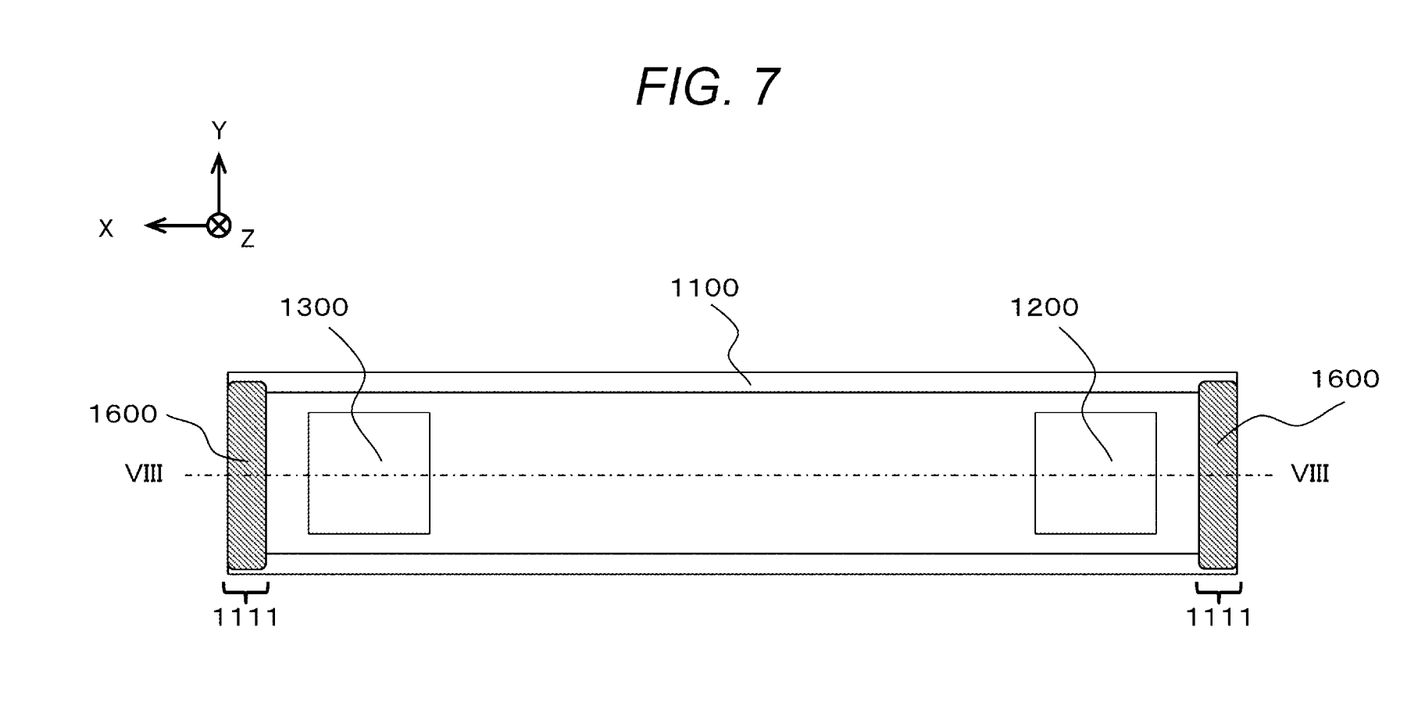
FIG. 7 is a diagram illustrating a stereo camera apparatus according to a second embodiment.

FIG. 7 is a diagram illustrating a stereo camera apparatus 1000A according to the second embodiment, and illustrates a position at which the adhesive 1600 is applied. That is, FIG. 7 is illustrated from the similar view point to FIG. 6. As illustrated in FIG. 7, the stereo camera apparatus 1000A has protrusions 1111 at both ends in the X direction. However, since the adhesive 1600 is applied onto the protrusion 1111, it is difficult to visually recognize the protrusion 1111 in FIG. 7.

Figure 8:
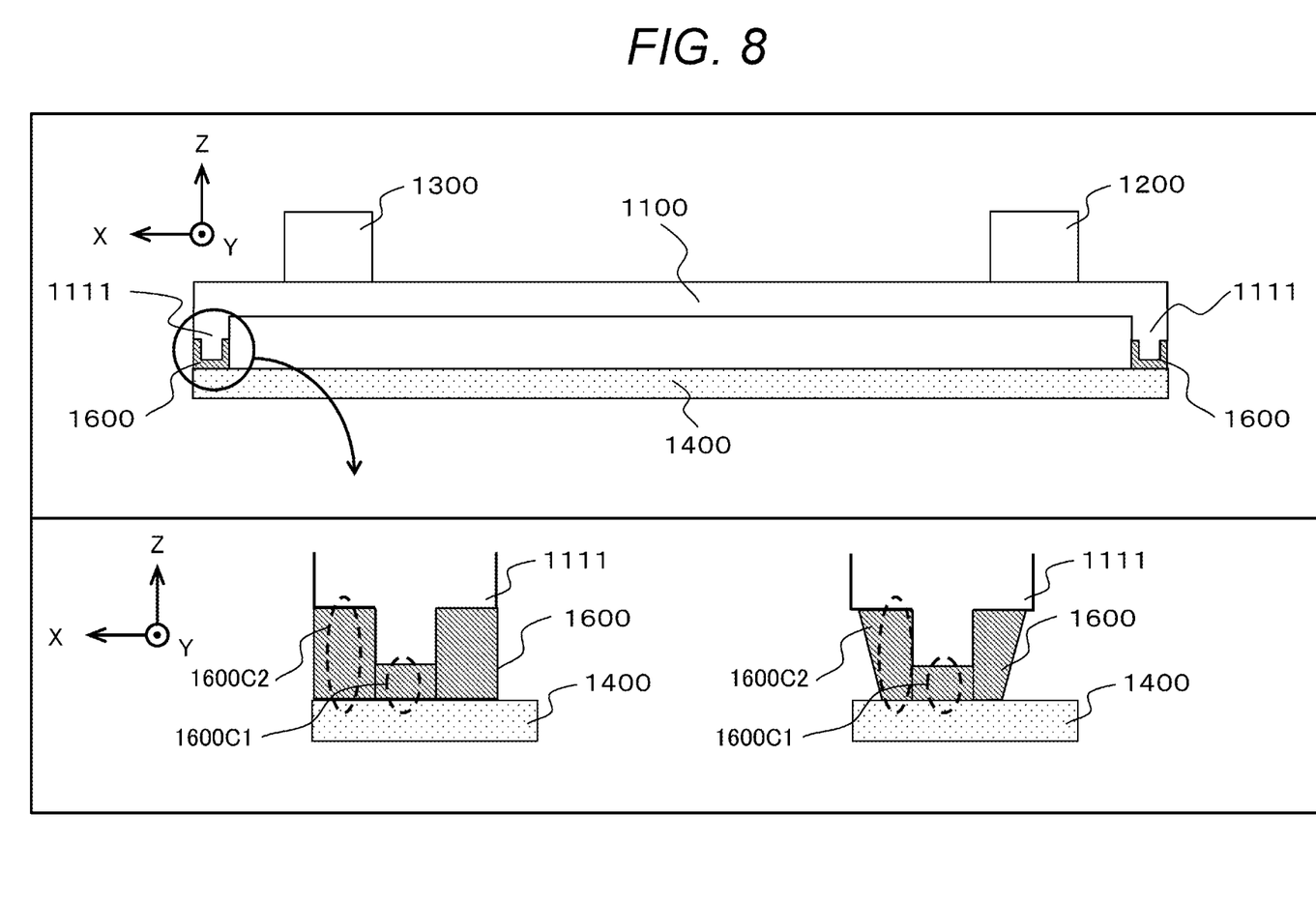
FIG. 8 is a cross-sectional view of the stereo camera apparatus in the second embodiment.

FIG. 8 is a cross-sectional view of the stereo camera apparatus 1000A, specifically, a cross-sectional view taken along line VIII-VIII in FIG. 7. As illustrated in FIG. 8, the protrusion 1111 has a convex shape protruding toward the circuit board 1400. The lower part of FIG. 8 illustrates an enlarged view of the protrusion 1111. The adhesive 1600 flows to fill a space between the protrusion 1111 and the circuit board 1400 and then solidifies. Therefore, an adhesive 1600C2 at the end portion of the protrusion 1111 is thicker than an adhesive 1600C1 at the central portion of the protrusion 1111. Therefore, the end portion of the protrusion 1111, to which the thermal stress in a peeling mode is likely to be applied, has a large thickness, and thus the force applied to the adhesive 1600 per unit volume is reduced.

The adhesive 1600 between the protrusion 1111 and the circuit board 1400 not only has a shape that completely fills a gap as illustrated on the lower left part of FIG. 8, but also has a slight gap at the end portion as illustrated on the lower right part of FIG. 8. Even in a case where a slight gap is generated, the adhesive 1600C2 at the end portion of the protrusion 1111 is thicker than the adhesive 1600C1 at the central portion of the protrusion 1111, so that it is possible to obtain the above-described effect.

According to the second embodiment described above, it is possible to obtain the following operational effects.

(3) The housing 1100 includes the protrusion 1111 that protrudes toward the circuit board 1400 and onto which the adhesive 1600 is applied. The thickness of the adhesive 1600C2 at the end portion of the protrusion 1111 is thicker than the thickness of the adhesive 1600C1 at the central portion of the protrusion. Therefore, it is possible to disperse the peeling force applied to the end portion of the adhesive 1600, and thus it is possible to prevent strength deterioration due to repeated temperature changes.

Third Embodiment

A stereo camera apparatus according to a third embodiment will be described below with reference to FIG. 9. In the following description, the same components as those of the first embodiment are denoted by the same reference signs, and differences will be mainly described. The points not specifically described are the same as those in the first embodiment. The present embodiment is different from the first embodiment mainly in that the adhesive is applied onto portions other than both the end portions in the longitudinal direction.

Figure 9:
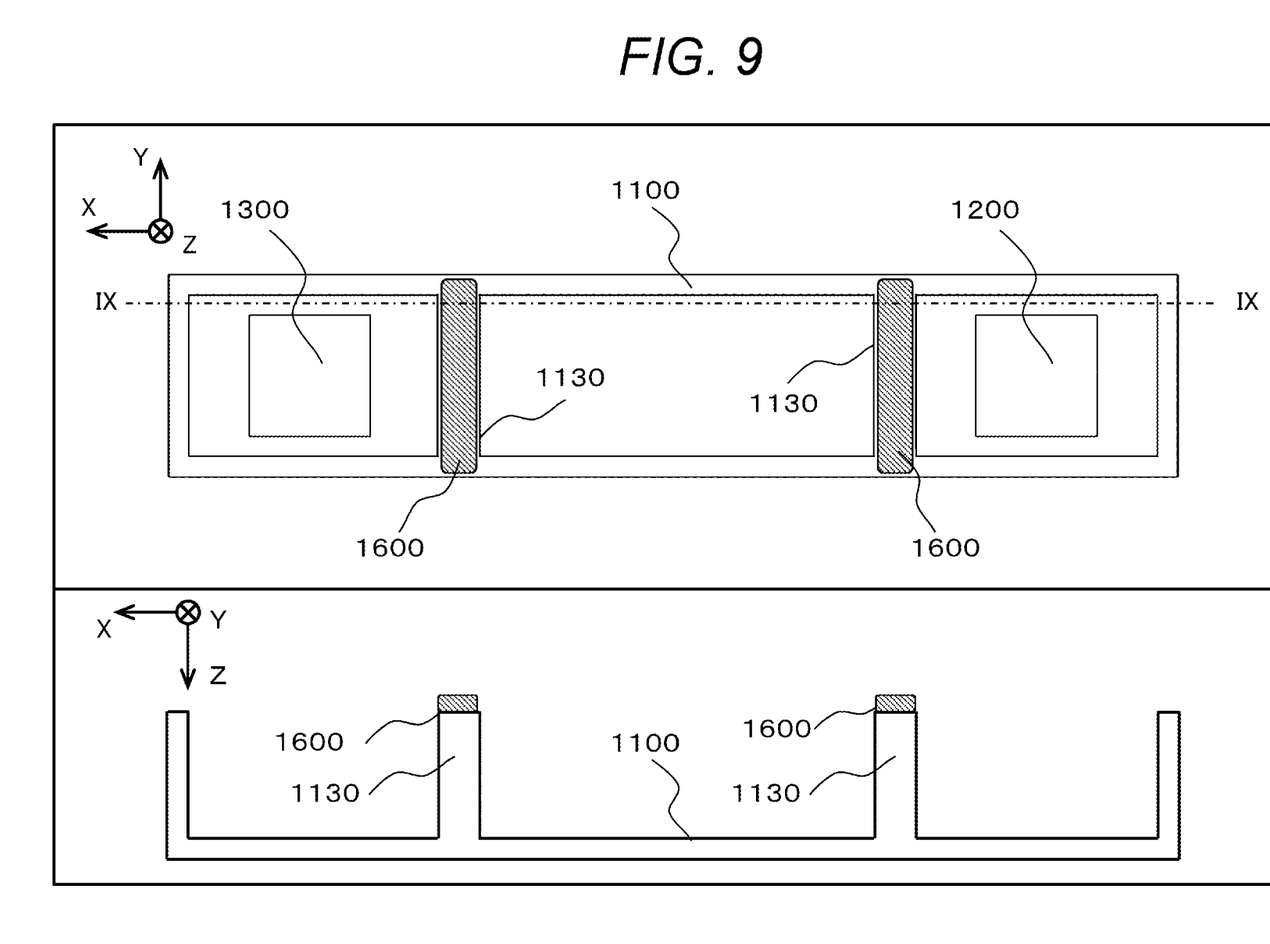
FIG. 9 is a view illustrating a stereo camera apparatus according to a third embodiment.

FIG. 9 is a view illustrating a stereo camera apparatus 1000B according to the present embodiment. The upper part of FIG. 9 illustrates a view point similar to the viewpoint in the upper parts of FIGS. 6 and 7. The lower part of FIG. 9 illustrates a cross section taken along line IX-IX in the upper part of FIG. 9.

In the present embodiment, the housing 1100 includes two coupling wall portions 1130. Each of the coupling wall portions 1130 extends from a surface of the housing 1100, that expands in an XY plane, that is, from a bottom surface toward the circuit board 1400. In addition, each of the coupling wall portions 1130 is in contact with a side surface of the housing 1100, and extends in the orthogonal direction. That is, the space formed by the bottom surface and the side surface of the housing 1100 is partitioned into three spaces by the two coupling wall portions 1130. Then, the adhesive 1600 is applied onto the top portion of the coupling wall portion 1130, and the top portion is connected to the circuit board 1400. The adhesive 1600 is applied onto both the end portions of the housing 1100 in the longitudinal direction in the first embodiment and the like. In the present embodiment, the adhesive 1600 is applied onto neither of the end portions of the housing 1100 in the longitudinal direction. Therefore, neither of the end portions of the housing 1100 in the longitudinal direction is connected to the circuit board 1400.

According to the third embodiment described above, it is possible to obtain the following operational effects.

(4) The housing 1100 has a region on which the adhesive 1600 is applied and which has the longitudinal direction in the orthogonal direction, that is, the top portion of the coupling wall portion 1130 at the place other than the end portion in the base line length direction. Therefore, even in a case where the stereo camera apparatus 1000B is exposed to an environmental temperature change, the bonded surfaces of the first camera unit 1200 and the second camera unit 1300 are not curved, and are close to the deformation mode in which the first camera unit and the second camera unit are simply inclined. Therefore, it is possible to reduce the stress applied to a screw fastening portion and an adhered portion.

Modification Example 1 of Third Embodiment

In the third embodiment described above, the position of the wall coupling portion 1130 in the longitudinal direction is not particularly specified. However, it is not preferable that the adhesive 1600 is present near the center of the housing 1100 in the longitudinal direction since the housing 1100 is also warped when the circuit board 1400 is warped. Therefore, it is preferable that the wall coupling portion 1130 onto which the adhesive 1600 is applied does not exist near the center of the housing 1100 in the longitudinal direction. Specifically, it is desirable that the two wall coupling portions 1130 arranged in the longitudinal direction of the housing 1100 are arranged at a distance longer than the length of the housing 1100 in the lateral direction.

Modification Example 2 of Third Embodiment

In the third embodiment described above, the housing 1100 includes the two wall coupling portions 1130. However, the housing 1100 may include three or more wall coupling portions 1130, and any of the wall coupling portions 1130 may have a region on which the adhesive 1600 is applied at the top. However, the region on which the adhesive 1600 is applied does not exist near the center of the housing 1100 in the longitudinal direction.

Fourth Embodiment

A stereo camera apparatus according to a fourth embodiment will be described below with reference to FIG. 10. In the following description, the same components as those of the third embodiment are denoted by the same reference signs, and differences will be mainly described. The points not specifically described are the same as those in the third embodiment. The present embodiment is different from the third embodiment mainly in that the coupling wall portion is not coupled to the side surface.

Figure 10:
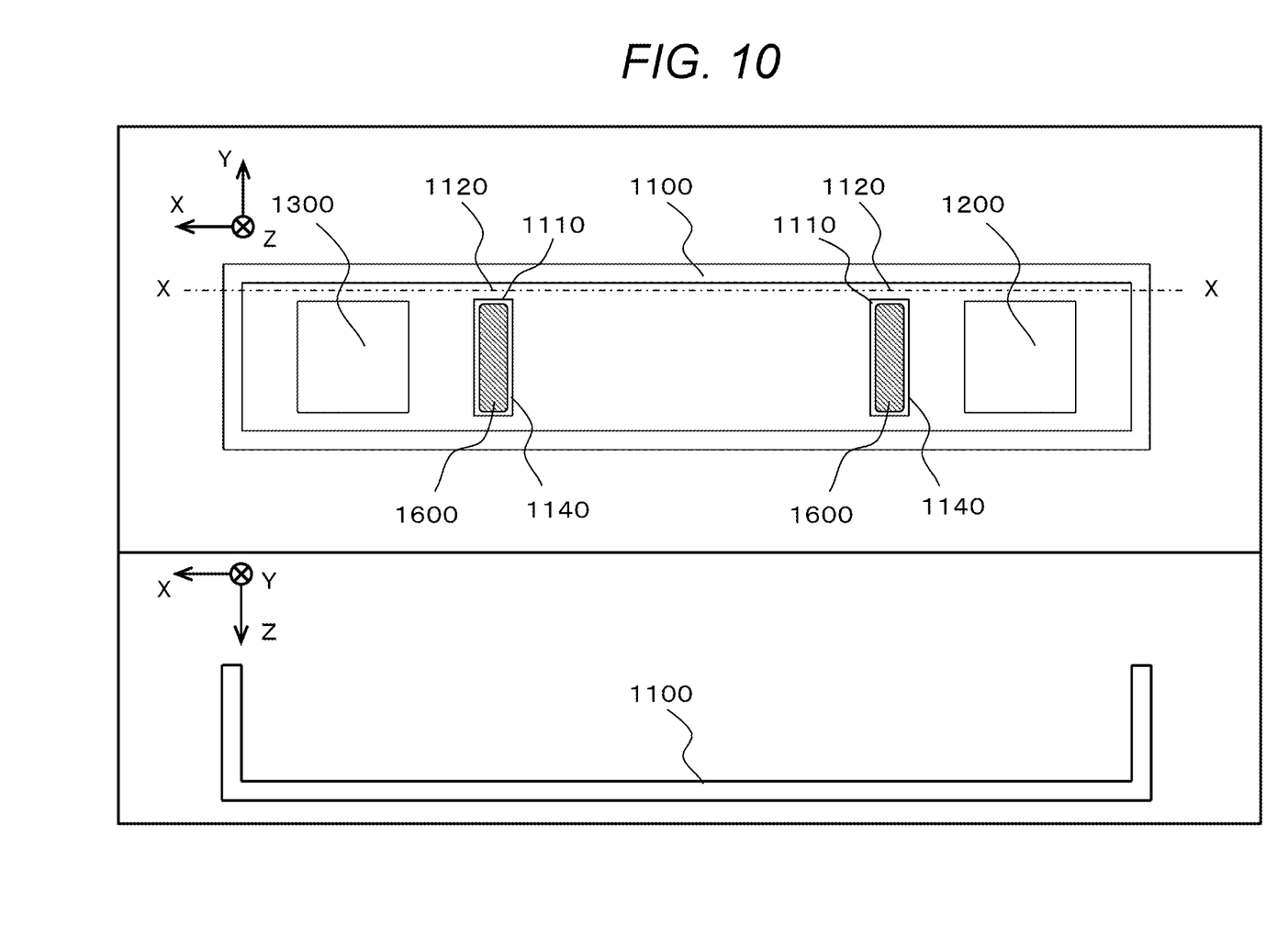
FIG. 10 is a view illustrating a stereo camera apparatus according to a fourth embodiment.

FIG. 10 is a view illustrating a stereo camera apparatus 1000C according to the present embodiment. The upper part of FIG. 10 illustrates a view point similar to the viewpoint in the upper part of FIG. 9. The lower part of FIG. 10 illustrates a cross section taken along line X-X in the upper part of FIG. 10. In the present embodiment, a non-coupling wall portion 1140 is provided instead of the coupling wall portion 1130 in the third embodiment. The coupling wall portion 1130 and the non-coupling wall portion 1140 are different from each other in that the non-coupling wall portion 1140 is not coupled to the side surface of the housing 1100. Therefore, since the non-coupling wall portion 1140 is not connected to the side surfaces of the housing 1100 but is connected only to the bottom surface, the connection rigidity between the circuit board 1400 and the housing 1100 other than the non-coupling wall portion 1140 decreases. Thus, when the temperature change occurs, the convex shape is actively deformed, and it is possible to further reduce warpage deformation of the housing 1100.

According to the fourth embodiment described above, it is possible to obtain the following operational effects.

(5) The housing 1100 has the substantially rectangular parallelepiped shape when the housing 1100 is bonded to the circuit board 1400 by using the adhesive 1600. The housing 1100 has a configuration corresponding to the bottom surface and the side surface of the substantially rectangular parallelepiped. The circuit board 1400 has a configuration corresponding to the top surface facing the bottom surface of the substantially rectangular parallelepiped. The housing 1100 has the non-coupling wall portion 1140 that extends from the bottom surface to the top surface, are not in contact with the side surface, and extends in the orthogonal direction. The adhesive 1600 is applied onto the top portion of the non-coupling wall portion 1140 and the top portion is connected to the top surface, that is, the circuit board 1400. Therefore, when the temperature change occurs, the convex shape is actively deformed, and it is possible to further reduce warpage deformation of the housing 1100.

Fifth Embodiment

A stereo camera apparatus according to a fifth embodiment will be described below with reference to FIG. 11. In the following description, the same components as those of the first embodiment are denoted by the same reference signs, and differences will be mainly described. The points not specifically described are the same as those in the first embodiment. The present embodiment is different from the first embodiment mainly in that the protrusion has a groove.

Figure 11:
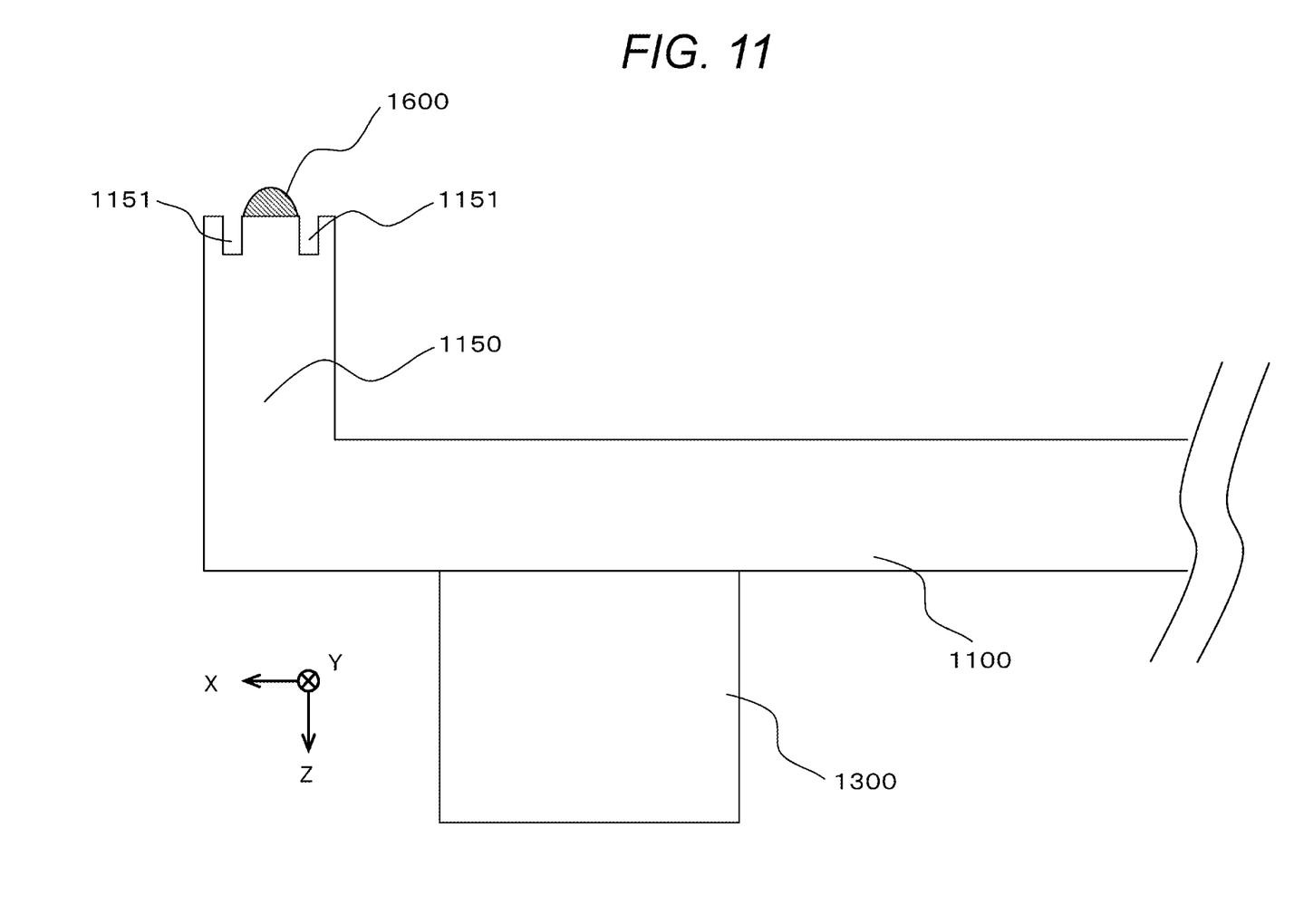
FIG. 11 is a view illustrating a stereo camera apparatus according to a fifth embodiment.

FIG. 11 is a view illustrating the housing 1100 of a stereo camera apparatus 1000D according to the present embodiment. The housing 1100 has a grooved protrusion 1150 that protrudes toward the circuit board 1400 and onto which the adhesive 1600 is applied. A groove shape 1151 is formed at an end portion of the grooved protrusion 1150. The groove shape 1151 may be any shape as long as the shape is closed on the XY plane, and may be any of a circle, a polygon, and an indefinite shape. The adhesive 1600 is disposed inside the groove shape 1151, and then adhered to the circuit board 1400.

In order to prevent the warpage deformation of the housing 1100, it is important to absorb the deformation of the member by thickening the adhesive 1600. In order to thicken the adhesive 1600, it is necessary to keep the height of the applied adhesive 1600 at a predetermined level or higher. In general, in a case where the viscosity of the adhesive 1600 is not sufficiently high, the adhesive 1600 tends to lose the wet-spreading height due to the lapse of time before curing. However, in the present embodiment, since the groove shape 1151 is provided, the edge portion of the groove shape 1151 hinders wet-spreading, and thus it is possible to suppress a decrease in the height of the uncured adhesive 1600.

According to the fifth embodiment described above, it is possible to obtain the following operational effects.

(6) The housing 1100 includes the grooved protrusion 1150 that protrudes toward the circuit board 1400 and onto which the adhesive 1600 is applied. The groove shape 1151 is formed at the end portion of the grooved protrusion 1150. Therefore, wet-spreading of the adhesive 1600 is suppressed, and thus it is possible to realize the thick adhesive 1600, and the warpage deformation of the housing 1100 is further suppressed.

Sixth Embodiment

A stereo camera apparatus according to a sixth embodiment will be described below with reference to FIG. 12. In the following description, the same components as those of the first embodiment are denoted by the same reference signs, and differences will be mainly described. The points not specifically described are the same as those in the first embodiment. The present embodiment is different from the first embodiment mainly in that a hole is provided in the circuit board 1400.

Figure 12:
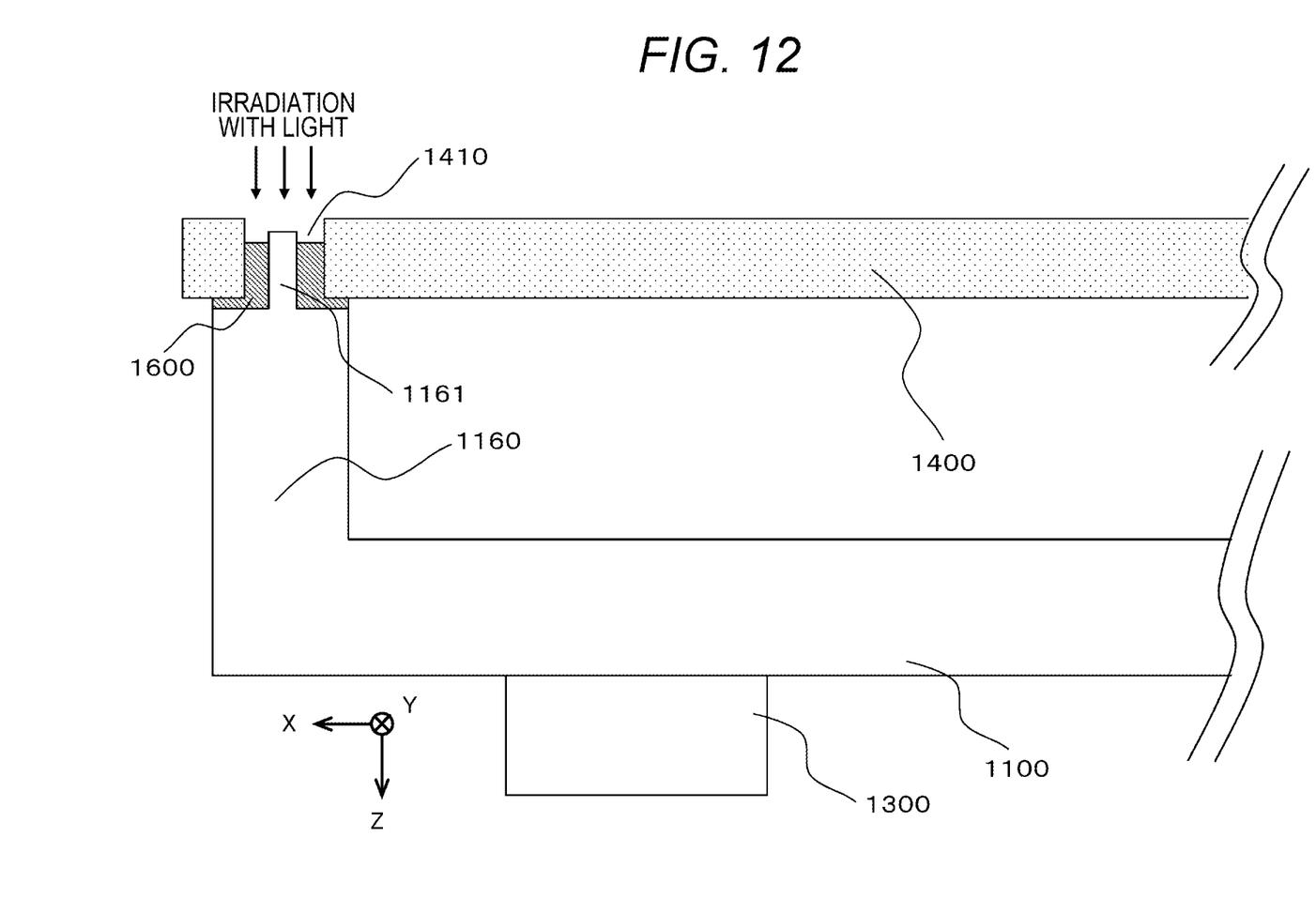
FIG. 12 is a view illustrating a stereo camera apparatus according to a sixth embodiment.

FIG. 12 is a view illustrating a stereo camera apparatus 1000E according to the sixth embodiment. The housing 1100 includes a pin-attached protrusion 1160 that protrudes toward the circuit board 1400. The pin-attached protrusion 1160 includes a pin 1161 at an end portion, that is, on the circuit board 1400 side. The housing 1100 and the circuit board 1400 are adhesively bonded in a state where the adhesive 1600 is applied around the pin 1161.

The circuit board 1400 includes a hole 1410, and the pin 1161 of the pin-attached protrusion 1160 is inserted. By irradiating the adhesive 1600 with which a space between the pin 1161 and the hole 1410 is filled, with light energy such as ultraviolet rays, it is possible to perform rapid provisional fixing between the housing 1100 and the circuit board 1400, and to speed up an adhesively bonding process. Furthermore, by adopting an adhesive structure in which the pin 1161 is inserted into the hole 1410, it is also possible to obtain an effect of improving the adhesive strength.

According to the sixth embodiment described above, it is possible to obtain the following operational effects.

(7) The hole 1410 is provided in the portion of the circuit board 1400 so that the adhesive 1600 is enabled to be accessed from the outside. By irradiating the adhesive 1600 with light energy such as ultraviolet rays through the hole 1410, it is possible to perform rapid provisional fixing between the housing 1100 and the circuit board 1400, and to speed up the adhesively bonding process.

(8) The housing 1100 includes the pin 1161 protruding toward the circuit board 1400, at the position corresponding to the hole 1410 provided in the circuit board 1400. Therefore, since the adhesive 1600 is bonded to the surface of the pin 1161, it is possible to increase the area to be adhered, and to improve the adhesive strength in the provisional fixing.

Modification Example of Sixth Embodiment

The housing 1100 may not include the pin 1161. Even in this case, by irradiating the adhesive 1600 with which a space between the pin 1161 and the hole 1410 is filled, with light energy such as ultraviolet rays, it is possible to perform rapid provisional fixing between the housing 1100 and the circuit board 1400, and to speed up an adhesively bonding process.

The above-described embodiments and modification examples may be combined. Although various embodiments and modification examples have been described above, the present invention is not limited to these contents. Other forms considered within the scope of the technical idea of the present invention are also included in the scope of the present invention.

The disclosure of the following priority application is incorporated herein by reference.

Japanese Patent Application No. 2019-191567 (filed on Oct. 18, 2019)

REFERENCE SIGNS LIST 1000, 1000A, 1000B, 1000C, 1000D, 1000E stereo camera apparatus

The invention claimed is:

1. A stereo camera apparatus comprising:
a housing;
a first camera unit attached to the housing;
a second camera unit attached to the housing;
a processing device that performs image processing by using captured images acquired by capturing of the first camera unit and the second camera unit; and
a circuit board on which the processing device is mounted,
   wherein a base line length direction of the first camera unit and the second camera unit is a longitudinal direction of the housing,
   the housing and the circuit board are bonded to each other by an adhesive,
   the housing includes a protrusion that protrudes toward the circuit board and onto which the adhesive is applied,
   a groove shape is formed at an end portion of the protrusion, and
   in a first region of the housing, onto which the adhesive is applied, a first length in the base line length direction is shorter than a second length in an orthogonal direction that is a direction perpendicular to the base line length direction.

2. The stereo camera apparatus according to claim 1, wherein
a first thickness of the adhesive at the end portion of the protrusion is thicker than a second thickness of the adhesive at a central portion of the protrusion.

3. The stereo camera apparatus according to claim 1, wherein the housing has a second region on which the adhesive is applied, and that has a longitudinal direction in the orthogonal direction, at a place other than an end portion in the base line length direction.

4. The stereo camera apparatus according to claim 1, wherein the housing has a substantially rectangular parallelepiped shape when the housing is bonded to the circuit board by using the adhesive, the housing has a first configuration corresponding to a bottom surface and a side surface of the substantially rectangular parallelepiped shape, the circuit board has a second configuration corresponding to a top surface facing the bottom surface of the substantially rectangular parallelepiped shape, the housing further includes a wall portion that extends from the bottom surface to the top surface and extends in the orthogonal direction without coming into contact with the side surface, and the adhesive is applied onto a top portion of the wall portion, and the top portion of the wall portion is connected to the top surface.

5. The stereo camera apparatus according to claim 1, wherein a hole is provided in a portion of the circuit board so that the adhesive is enabled to be accessed from an outside.

6. The stereo camera apparatus according to claim 5, wherein the housing includes a pin protruding toward the circuit board, at a position corresponding to the hole provided in the circuit board.

7. The stereo camera apparatus according to claim 1, wherein the adhesive contains any one of modified acrylate, modified silicone, and urethane as a main component, and has an elastic modulus that is equal to or less than 10% of elastic moduli of the circuit board and the housing.

* * * * *